US006178047B1

(12) United States Patent
Cook

(10) Patent No.: US 6,178,047 B1
(45) Date of Patent: Jan. 23, 2001

(54) TWO-PATH ALL-REFLECTIVE DE-ROTATION OPTICAL SYSTEM

(75) Inventor: Lacy G. Cook, El Segundo, CA (US)

(73) Assignee: Raytheon Company, Lexington, MA (US)

( * ) Notice: Under 35 U.S.C. 154(b), the term of this patent shall be extended for 0 days.

(21) Appl. No.: 09/323,799

(22) Filed: Jun. 1, 1999

(51) Int. Cl.[7] ............ G02B 27/14; G02B 23/02; G02B 23/00
(52) U.S. Cl. ............ 359/634; 359/629; 359/401; 359/365
(58) Field of Search ................ 359/629–640, 359/722, 726, 727, 730, 744, 858, 833, 834, 836, 837, 364, 365, 366, 401

(56) References Cited

U.S. PATENT DOCUMENTS

| | | | |
|---|---|---|---|
| 1,006,230 | * 10/1911 | Kollmorgen | 359/401 |
| 3,625,612 | * 12/1971 | Decker et al. | 356/24 |
| 3,761,714 | * 9/1973 | Fernandez et al. | 250/348 |
| 3,854,821 | * 12/1974 | Thompson | 356/152 |
| 3,966,298 | * 6/1976 | Chapman | 350/23 |
| 4,621,888 | * 11/1986 | Crossland et al. | 350/1.2 |
| 4,632,521 | * 12/1986 | Korsch | 350/505 |
| 4,804,258 | * 2/1989 | Kebo | 350/505 |
| 4,929,040 | * 5/1990 | Pagano et al. | 350/6.5 |
| 5,078,502 | 1/1992 | Cook | 359/366 |
| 5,296,972 | * 3/1994 | McKinley | 359/861 |

* cited by examiner

*Primary Examiner*—Georgia Epps
*Assistant Examiner*—David N. Spector
(74) *Attorney, Agent, or Firm*—Colin M. Raufer; Leonard A. Alkov; Glenn H. Lenzen, Jr.

(57) ABSTRACT

An all-reflective optical system includes an entrance aperture, an exit aperture, and a dichroic beam splitter assembly. The dichroic beam splitter assembly includes an entrance dichroic beam splitter and an exit dichroic beam splitter. The reflected portion of the beam from the entrance dichroic beam splitter passes to a first beam processing array having an odd number of powered mirrors. The transmitted portion of the beam from the entrance dichroic beam splitter passes to a second beam processing array having an odd number of flat mirrors. The second beam processing array and the first beam processing array are circumferentially angularly displaced by about 90 degrees of rotation about an optical reference axis. The dichroic beam splitter assembly, the first beam processing array, and the second beam processing array together comprise a single optical unit rotatable about the optical reference axis, and a bearing set is provided to accomplish the rotation.

18 Claims, 2 Drawing Sheets

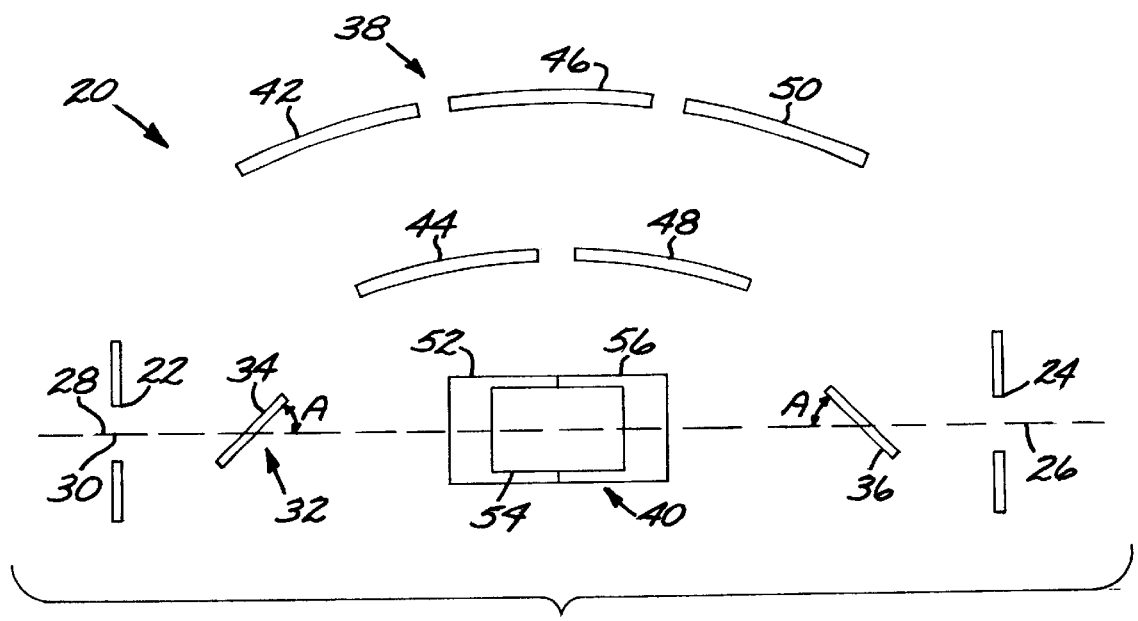
FIG.1
FIG.2
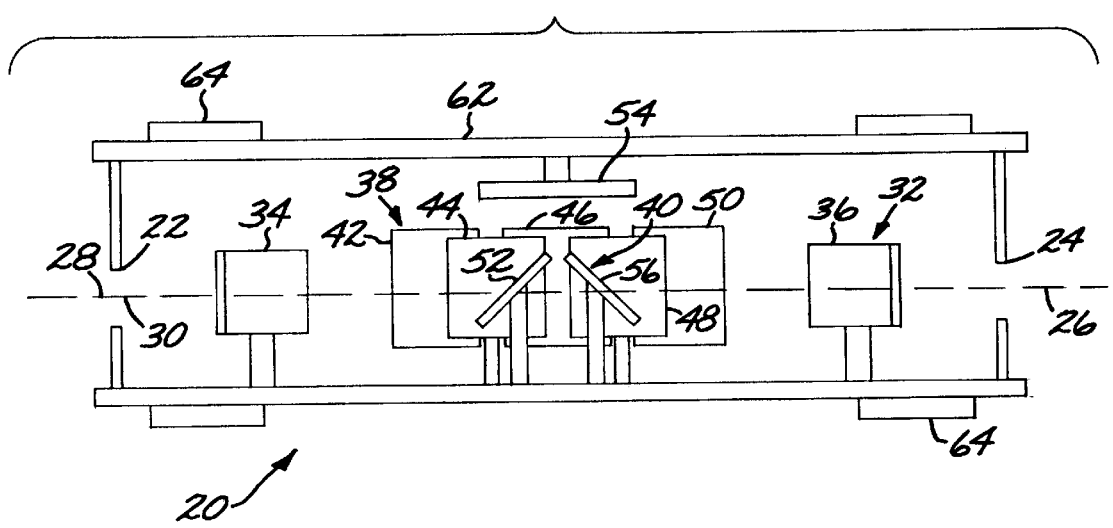

TWO-PATH ALL-REFLECTIVE DE-ROTATION OPTICAL SYSTEM

BACKGROUND OF THE INVENTION

This invention relates to optical devices, and, more particularly, to an all-reflective optical de-rotation device that separately processes two beams and tends to negate the effects of bearing imperfections.

In one type of optical system, an optical train directs a beam into a detector. The detector converts the beam energy into electrical signals, which are processed for viewing or analysis. All or some of the optical train may be supported on a gimbal structure to permit it to be pointed at portions of a scene that are of interest. As the gimbal articulates to change the pointing direction, the beam rotates so that the image on the detector rotates.

This rotation of the image is undesirable, as it greatly complicates the image analysis. To overcome this problem, a de-rotation device is included in the optical train. The de-rotation device compensates for the rotation of the beam resulting from articulation of the gimbal. De-rotation devices have typically incorporated a de-rotation segment utilizing prisms and/or planar mirrors and, where the beam is to be imaged, an imaging segment utilizing lenses and mirrors. These conventional devices, while operable, are heavy and complex.

An improved all-reflective re-imaging de-rotation optical device, comprising two planar beam-folding mirrors and an off-axis powered-mirror set, is disclosed in U.S. Pat. No. 5,078,502. The powered-mirror set reimages the beam to form an intermediate image at one of the mirrors, which is the third mirror in the five-mirror embodiment of the '502 patent.

While operable in many applications, the optical device of the '502 patent has some limitations in other applications. Some advanced optical systems utilize and must process two optical beams, each of which requires de-rotation. For example, the two beams may include an imaged, relatively low-energy visible and/or infrared beam that is the image of the scene, and a non-imaged, relatively high-energy near-infrared laser beam that provides ranging, designating, and/or targeting functions. The present inventor has observed that the optical device of the '502 patent is not suitable for processing both of these beams through the same optical train, because the relatively high-energy beam may damage the mirror at which the intermediate reimage is formed.

There is a need for an improved de-rotation optical device which is suitable for processing two different types of beams. The present invention fulfills this need, and further provides related advantages.

SUMMARY OF THE INVENTION

The present invention provides an all-reflective de-rotation optical system that is operable with two input beams. The two input beams are processed separately with two different internal optical paths, so that a higher energy beam cannot damage the imaging mirrors used with a lower-energy beam. No powered refractive components are used in the optical system, which is consequently operable over a wide range of wavelengths. In most applications, the optical system must rotate about an optical reference axis, and is supported on bearings for that purpose. In one embodiment, the optical system is such that the responses to bearing imperfections of the two beam processing arrays are the same, avoiding line-of-sight errors that would otherwise arise from the bearing imperfections.

In accordance with the invention, an all-reflective optical system comprises an entrance region coincident with an optical reference axis, an exit region coincident with the optical reference axis, and a dichroic beam splitter assembly coincident with the optical reference axis. The dichroic beam splitter assembly includes an entrance dichroic beam splitter positioned to receive radiation passing through the entrance region, and an exit dichroic beam splitter positioned to direct radiation through the exit region. The optical system further comprises a first beam processing array having a first array input beam of a first wavelength range reflected from the entrance dichroic beam splitter and a first array output beam of the first wavelength range directed to the exit dichroic beam splitter so as to be reflected through the exit region, and a second beam processing array having a second array input beam of a second wavelength range transmitted through the entrance dichroic beam splitter and a second array output beam of the second wavelength range transmitted through the exit dichroic beam splitter to the exit region.

Preferably, the entrance region comprises an entrance aperture, and the exit region comprises an exit aperture. The dichroic beam splitter assembly may be reflective of a first wavelength range in the visible and/or the infrared, and transmissive of a second wavelength range in the infrared, or may be of some other functional characteristic. The first beam processing array comprises an odd number of powered mirrors, preferably five mirrors. The second beam processing array comprises an odd number of flat mirrors, preferably three flat mirrors.

In one form, the dichroic beam splitter, the first beam processing array, and the second beam processing array together comprise a single optical unit rotatable about the optical reference axis. A bearing set supports the single optical unit for rotation about the optical reference axis. Preferably, the second beam processing array and the first beam processing array are circumferentially angularly displaced by about 90 degrees about the optical reference axis. This arrangement of the two beam processing arrays has important advantages, because the assembly is insensitive to differential line of sight errors between the two beam processing arrays that would otherwise be introduced by bearing imperfections. That is, all systems mounted on bearings are subject to wobbling effects due to the imperfections that are present in bearings, regardless of the care taken to minimize bearing imperfections. In the present case, the problems resulting from bearing imperfections would be expected to be exacerbated because there are two beams being processed in the optical system along two substantially different beam paths. The 90-degree circumferential displacement of the two beam processing arrays has been found to negate the differential errors, minimizing line-of-sight (boresighting) errors that would be otherwise expected.

The present optical system is entirely reflective using mirrors, and has no powered refractive components such as lenses. (In this art, an optical system is considered to be "all-reflective" even if some non-powered refractive elements, such as windows, dichroic beam splitters, and spectral filters, are present.) This permits the optical system to be operable over a wide range of wavelengths such as, for example, both visible and infrared wavelength ranges. Refractive optics generally cannot be used in broadband applications, because the powered lenses have wavelength-dependent focal lengths and aberrations. The focal plane location of a refractive imaging system varies as a function of the wavelength of the radiation, complicating or degrading the imaging process.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic plan view of an optical system according to the invention;

FIG. 2 is a schematic side view of the optical system of FIG. 1;

DETAILED DESCRIPTION OF THE INVENTION

Figure 3:
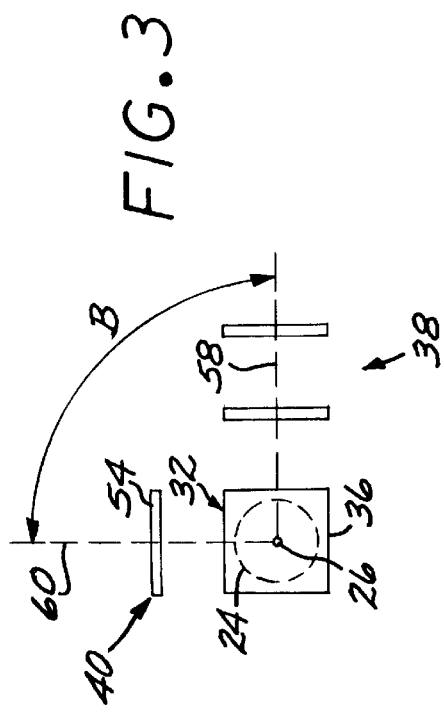
FIG. 3 is a schematic end view of the optical system of FIG. 1, taken along the optical reference axis.
Figure 4:
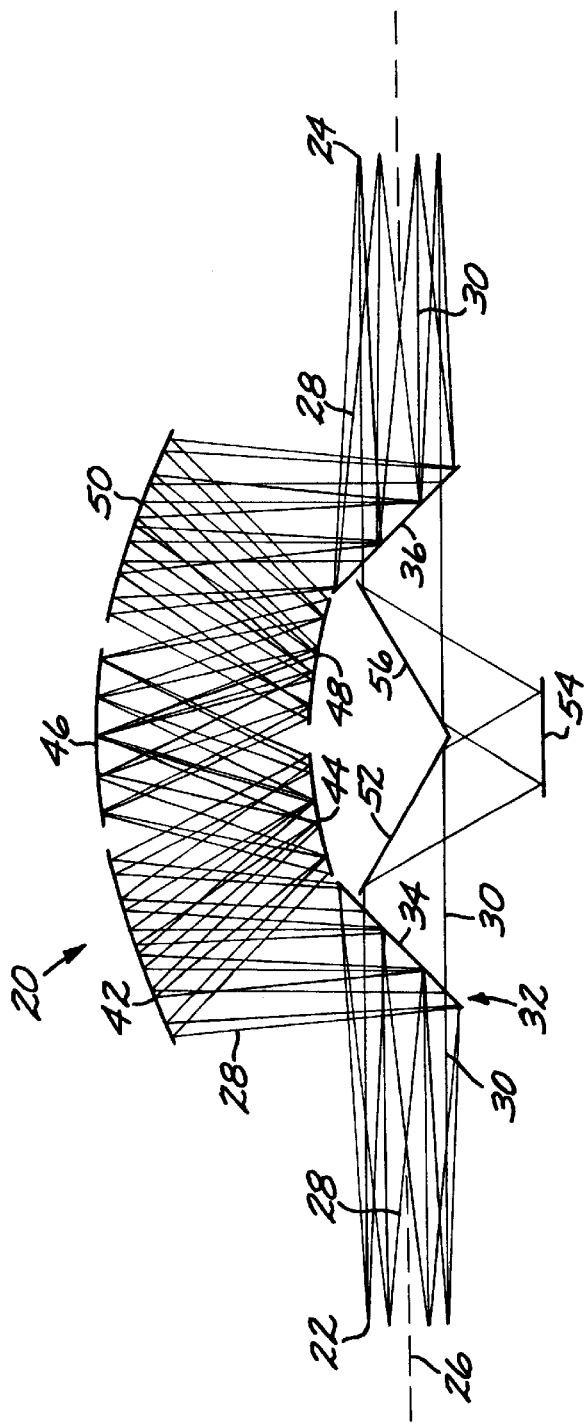
FIG. 4 is a schematic plan view ray path diagram for the optical system of FIG. 1, folded flat for purposes of illustration of the interrelations of the two optical ray paths.

FIGS. 1–3 are, respectively, schematic plan, side, and end views of a preferred embodiment of an optical system 20 of the invention. The support housing and bearing structure are illustrated only in FIG. 2 for clarity, but would be present in the optical systems of FIGS. 1 and 2 as well. FIG. 4 is a ray path diagram of the optical system 20 in a plan view. In FIG. 4, the second beam processing array is folded flat into the same plane as the first beam processing array for clarity of illustration, although in practice the two arrays are preferably displaced by about 90 degrees to each other as will be discussed subsequently and illustrated in FIG. 3.

The optical system 20 includes an entrance region in the form of an entrance aperture 22 and an exit region in the form of an exit aperture 24. The entrance aperture 22 and the exit aperture 24 are arranged coincident with an optical reference axis 26, and are of any operable shape. In FIGS. 1, 2, and 4, two beams of radiation 28 and 30 enter the illustrations from the left and exit to the right, in each case coincident with the optical reference axis 26. The first radiation beam 28 is a low-energy imaged beam, typically in a visible and/or infrared wavelength range. The second radiation beam 30 is a higher-energy nonimaged beam, typically an infrared laser beam having a wavelength in the near-infrared wavelength range of about 1–1.6 micrometers.

Also lying coincident with the optical reference axis 26 is a dichroic beam splitter assembly 32. The dichroic beam splitter assembly 32 includes an entrance dichroic beam splitter 34 positioned to receive the beams 28 and 30 through the entrance aperture 22. The dichroic beam splitter assembly 32 further includes an exit dichroic beam splitter 36 positioned to direct the beams 28 and 30 through the exit aperture 24 in a direction coincident with the optical reference axis 26. The entrance dichroic beam splitter 34 and the exit dichroic beam splitter 36 are each flat and are oriented at an angle A to the optical reference axis 26, which is preferably about 45 degrees.

In general, a dichroic beam splitter reflects one part of an incident beam and transmits (passes through) another part of an incident beam. In this case, each of the dichroic beam splitters 34 and 36 reflects the first radiation beam 28 and transmits the second radiation beam 30. Dichroic beam splitters are known in the art.

The optical system 20 further includes a first beam processing array 38 and a second beam processing array 40.

The first beam processing array 38 receives the reflected first radiation beam 28 from the entrance dichroic beam splitter 34, and, after several reflections, directs the first radiation beam 28 to the exit dichroic beam splitter 36, where it is reflected along the optical reference axis 26 through the exit aperture 24. The second beam processing array 38 receives the transmitted second radiation beam 30 from the entrance dichroic beam splitter 34, and, after several reflections, directs the second radiation beam 30 to the exit dichroic beam splitter 36, where it is transmitted coincident with the optical reference axis 26 and through the exit aperture 24.

The first beam processing array 38 preferably includes a reflective de-rotation array of mirrors using an odd number of mirrors. The first radiation beam 28 is reflected from a first mirror 42 of positive power to a second mirror 44 of negative power, and thence to a third mirror 46 of positive power. The first radiation beam 28 is reimaged at the third mirror 46. The first radiation beam 28 is thereafter reflected from the third mirror 46 to a fourth mirror 48 of negative power, to a fifth mirror 50 of positive power. The first radiation beam 28 reflects from the fifth mirror 50 to the exit dichroic beam splitter 36. The mirrors 42, 44, 46, 48, and 50 are all positioned laterally apart from the optical reference axis 26. The mirrors 42, 44, 46, 48, and 50 may be of any operable shape, such as a spherical, conic, or higher-order general aspheric shapes. U.S. Pat. No. 5,078,502, whose disclosure is incorporated by reference, sets forth an example of an operable specific optical prescription for the mirrors 42, 44, 46, 48, and 50.

The second beam processing array 40 includes a primary flat mirror 52 positioned along the optical reference axis 26 to receive the second radiation beam 30 transmitted through the entrance dichroic beam splitter 34. The primary flat mirror 52 reflects the second radiation beam 30 to a secondary flat mirror 54 lying parallel to and laterally separated from the optical reference axis 26. The secondary flat mirror 54 reflects the second radiation beam 30 to a tertiary flat mirror 56 lying on the optical reference axis 26. The tertiary flat mirror 56 reflects the second radiation beam 30 coincident with the optical reference axis 26, through the exit dichroic beam splitter 36, and through the exit aperture 24.

As may be seen in FIG. 3, mirrors 42, 44, 46, 48, and 50, and the first radiation beam 28 as it is reflected from them, generally define a first beam processing array plane 58. Similarly, mirrors 52, 54, and 56, and the second radiation beam 30 as it is reflected from them, generally define a second beam processing array plane 60. There is an angle B between the planes 58 and 60 when the planes are viewed parallel to the optical reference axis 26 as in FIG. 3. The present invention is operable for any angle B. However, special advantages are realized when the angle B is about 90 degrees, as illustrated for the preferred embodiment.

As illustrated in FIG. 2, the apertures 22 and 24, the dichroic beam splitters 34 and 36, and the mirrors 42, 44, 46, 48, 50, 52, 54, and 56 are integrated into a single optical unit and affixed to a support 62. In this case, the support 62 is a tubular housing. The support 62 is preferably supported on a bearing set 64 so that the support 62, and all of the supported structure, are rotatable about the optical reference axis 26. This type of arrangement is preferably employed in achieving optical de-rotation in gimbaled pointing structures where there are two incident beams, one a broad field of view, low intensity beam of the image of the scene (i.e., the first radiation beam 28) and the other a narrow, high-intensity laser beam (i.e., the second radiation beam 30) used for ranging, designating, and/or targeting functions. In such a structure, the support 62 rotates on the bearings 64 as the gimbal articulates.

Bearings 64 are physical structures which are produced to high tolerances. However, regardless of the care taken and the established tolerances, there is always some degree of imperfection in bearing structures. In a pointing array such as that discussed here, the imperfections in the bearing structure lead to line-of-sight errors in establishing the location of the objects of interest in the scene. The line-of-sight errors are compounded where there are two beams 28 and 30 to be considered, leading to differential line-of-sight errors where the two beams may appear to come from different locations rather than the same target area of the scene.

Unexpectedly, setting the angle B at about 90 degrees of rotation about the optical reference axis 26 (in either clockwise or counterclockwise direction of rotation) has been found to negate differential line-of-sight errors between the two beams 28 and 30 that otherwise arise from bearing imperfections as the support 62 rotates on the bearings 64 about the optical reference axis 26. This negation of differential line-of-sight errors is believed to arise because the response to the bearing errors of both optical paths is the same. As a result, the beams 28 and 30 entering the optical system 20 originate at the same location in the viewed scene, regardless of the angular rotation position of the support 62 on the bearings 64.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An all-reflective optical system, comprising:
    an entrance region coincident with an optical reference axis;
    an exit region coincident with the optical reference axis;
    a dichroic beam splitter assembly coincident with the optical reference axis, the dichroic beam splitter assembly including
        an entrance dichroic beam splitter positioned to receive radiation passing through the entrance region, and
        an exit dichroic beam splitter positioned to direct radiation through the exit region;
    a first beam processing array having a first array input beam of a first wavelength range reflected from the entrance dichroic beam splitter and a first array output beam of the first wavelength range directed to the exit dichroic beam splitter so as to be reflected through the exit region; and
    a second beam processing array having a second array input beam of a second wavelength range transmitted through the entrance dichroic beam splitter and a second array output beam of the second wavelength range transmitted through the exit dichroic beam splitter to the exit region.

2. The optical system of claim 1, wherein the second beam processing array and the first beam processing array are circumferentially angularly displaced by about 90 degrees of rotation about the optical reference axis.

3. The optical system of claim 1, wherein the dichroic beam splitter assembly, the first beam processing array, and the second beam processing array together comprise a single optical unit rotatable about the optical reference axis.

4. The optical system of claim 3, including
    a bearing set operable to support the single optical unit for rotation about the optical reference axis.

5. The optical system of claim 1, wherein the first beam processing array comprises an odd number of powered mirrors.

6. The optical system of claim 1, wherein the second beam processing array comprises an odd number of flat mirrors.

7. The optical system of claim 1, wherein the dichroic beam splitter assembly is reflective of a first wavelength range in the visible and the infrared, and transmissive of a second wavelength range in the near infrared.

8. The optical system of claim 1, wherein
    the entrance region comprises an entrance aperture, and
    the exit region comprises an exit aperture.

9. An all-reflective optical system, comprising:
    an entrance aperture coincident with an optical reference axis;
    an exit aperture coincident with the optical reference axis;
    a dichroic beam splitter assembly coincident with the optical reference axis, the dichroic beam splitter assembly including
        an entrance dichroic beam splitter positioned to receive radiation passing through the entrance aperture, and
        an exit dichroic beam splitter positioned to direct radiation through the exit aperture coincident with the optical reference axis;
    a first beam re-imaging de-rotation processing array having a first array input beam of a first wavelength range reflected from the entrance dichroic beam splitter and a first array output beam of the first wavelength range directed to the exit dichroic beam splitter so as to be reflected through the exit aperture coincident with the optical reference axis; and
    a second beam non-re-imaging processing array having a second array input beam of a second wavelength range transmitted through the entrance dichroic beam splitter and a second array output beam of the second wavelength range transmitted through the exit dichroic beam splitter to the exit aperture coincident with the optical reference axis.

10. The optical system of claim 9, wherein the second beam processing array and the first beam processing array are circumferentially angularly displaced by about 90 degrees of rotation about the optical reference axis.

11. The optical system of claim 9, wherein the dichroic beam splitter assembly, the first beam re-imaging de-rotation processing array, and the second beam non-re-imaging processing array together comprise a single optical unit rotatable about the optical reference axis.

12. The optical system of claim 11, including
    a bearing set operable to support the single optical unit for rotation about the optical reference axis.

13. The optical system of claim 9, wherein the first beam re-imaging de-rotation processing array comprises
    a first positive-powered mirror positioned to receive the first array input beam,
    a second negative-powered mirror positioned to receive a first mirror reflected beam from the first mirror,
    a third positive-powered mirror positioned to receive a second mirror reflected beam from the second mirror,
    a fourth negative-powered mirror positioned to receive a third mirror reflected beam from the third mirror,
    a fifth positive-powered mirror positioned to receive a fourth mirror reflected beam from the fourth mirror and to direct a fifth mirror reflected beam as the first array output beam.

14. The optical system of claim 9, wherein the second beam non-re-imaging processing array comprises
   a primary flat mirror positioned to receive the second array input beam,
   a secondary flat mirror positioned to receive a primary mirror reflected beam from the primary mirror, and
   a tertiary flat mirror positioned to receive a secondary mirror reflected beam from the secondary mirror and to direct a tertiary mirror reflected beam as the second array output beam.

15. The optical system of claim 9, wherein the dichroic beam splitter assembly is reflective of a first wavelength range in the visible and the infrared, and transmissive of a second wavelength range in the near infrared.

16. An all-reflective optical system, comprising:
   an entrance aperture coincident with an optical reference axis;
   an exit aperture coincident with the optical reference axis;
   a dichroic beam splitter assembly coincident with the optical reference axis, the dichroic beam splitter assembly including
      an entrance dichroic beam splitter positioned to receive radiation passing through the entrance aperture, and
      an exit dichroic beam splitter positioned to direct radiation through the exit aperture coincident with the optical reference axis;
   a first beam re-imaging de-rotation processing array having a first array input beam of a first wavelength range reflected from the entrance dichroic beam splitter and a first array output beam of the first wavelength range directed to the exit dichroic beam splitter so as to be reflected through the exit aperture coincident with the optical reference axis, the first beam re-imaging de-rotation processing array comprising an odd number of powered mirrors; and
   a second beam non-re-imaging processing array having a second array input beam of a second wavelength range transmitted through the entrance dichroic beam splitter and a second array output beam of the second wavelength range transmitted through the exit dichroic beam splitter to the exit aperture coincident with the optical reference axis, the second beam non-re-imaging processing array comprising an odd number of flat mirrors, wherein
   the second beam non-re-imaging processing array and the first beam re-imaging, de-rotation processing array are angularly separated by 90 degrees rotation about the optical reference axis, and wherein
   the dichroic beam splitter assembly, the first beam re-imaging de-rotation processing array, and the second beam non-re-imaging processing array together comprise a single optical unit rotatable about the optical reference axis.

17. The optical system of claim 16, including
   a bearing set operable to support the single optical unit for rotation about the optical reference axis.

18. The optical system of claim 16, wherein the second beam processing array and the first beam processing array are circumferentially angularly displaced by about 90 degrees of rotation about the optical reference axis.

* * * * *